Oct. 22, 1968

W. HERTL 3,407,090

FIBERS OF SUBMICROSCOPIC BETA-SILICON CARBIDE
CRYSTALS WITH SHEATH OF SILICA

Filed Dec. 7, 1965

*INVENTOR.*
*William Hertl*

BY

ATTORNEY 3,407,090
FIBERS OF SUBMICROSCOPIC BETA-SILICON CARBIDE CRYSTALS WITH SHEATH OF SILICA
William Hertl, Corning, N.Y., assignor to Corning Glass Works, Corning, N.Y., a corporation of New York
Filed Dec. 7, 1965, Ser. No. 512,043
6 Claims. (Cl. 117—106)

ABSTRACT OF THE DISCLOSURE

This invention relates to a method of manufacturing submicroscopic fibers containing beta-silicon carbide crystals with a surface sheath of silica comprising: (1) providing finely divided silicon carbide crystals in a reaction chamber, (2) evacuating and heating chamber to a temperature between 1350° C. and 1650° C., (3) contacting the silicon carbide change with at least one oxidizing gas selected from the group consisting of carbon dioxide, oxygen and water vapor, the oxidizing gas having a total partial pressure of at least 5 mm. of mercury and (4) cooling grown fibers to room temperature.

---

Figure 1:
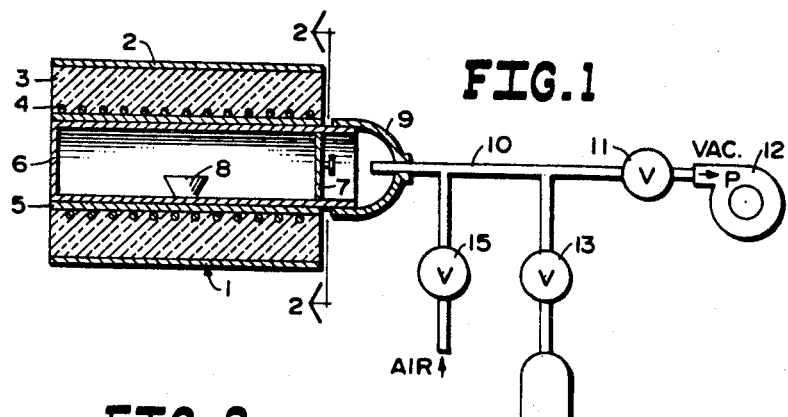

This invention relates to the manufacture of fibers containing silicon carbide crystals. More specifically, this invention relates to the manufacture of submicroscopic fibers containing silicon carbide crystals through the controlled oxidation of silicon carbide powder.

During the past several years, research activity has been great in the effort to develop economical and efficient means for synthesizing fibers composed of crystalline materials. Fibers of glass are well-known in the art and their use as reinforcing elements when embedded in plastics and cements well-recognized. However, it has been appreciated that the intrinsic mechanical strength of crystalline fibers such as alumina ($Al_2O_3$) and silicon carbide (SiC) is considerably greater than that exhibited by glass fibers and their inertness to chemical attack, especially at high temperatures, is markedly superior. These exceptional characteristics have fostered the desire to use such fibers as reinforcing elements for plastics, cements, and metals. Fibers of silicon carbide demonstrate outstanding mechanical strength under load at elevated temperatures and are quite inert to chemical corrosion even at high temperatures.

Since the prospective applications for such fibers appear tremendous, experimentation has been widespread and diversely directed to discover methods for producing such fibers which would be commercially practical. The principal methods developed can be generally categorized into four basic approaches: (1) thermal decomposition of certain volatile compounds containing carbon and silicon; (2) crystallization from molten silicon carbide; (3) thermal reduction of certain compounds of carbon and silicon in the presence of hydrogen; and (4) vapor deposition resulting from subliming a reaction mixture of carbon and silica. Each of these methods is capable of producing fibers and research is likely continuing in efforts to improve the quality and quantity of the products resulting from these processes. The process of the present invention, however, contemplates a different approach to the growth of silicon carbide fibers.

Another factor which has influenced the direction of the research effort has been the question as to which size of fiber is of the most practical use. Hence, fibers have been synthesized with lengths as long as several inches. Other growths have resulted in fibers so small as to be submicroscopic in size. One important advantage these very small fibers possess is that the discontinuities in the structure of the fiber, which frequently occur in the long fibers, are generally absent so the immense inherent strength of the crystalline structure can be utilized fully. Also, of course, the fineness of the fibers renders their dispersion in liquids much easier. Both of these factors make such fibers particularly suitable as reinforcing elements in plastics, rubber, cements, and metals.

The principal object of my invention, therefore, is to provide a method for producing submicroscopic-sized fibers containing silicon carbide crystals which are relatively uniform in physical dimensions such that they are especially suitable as reinforcing elements when embedded in plastics, rubbers, cements, and metals.

Another object of my invention is to provide a method for making submicroscopic fibers containing silicon carbide crystals which is relatively simple in operation, economical in practice, and which uses readily available starting materials.

Yet another object of my invention is to provide a method for manufacturing submicroscopic fibers containing crystalline silicon carbide which can be performed with a relatively simple and inexpensively-constructed apparatus.

Figure 2:
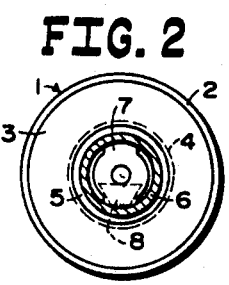

Still other objects will become apparent from the following description and a study of the appended drawings wherein:

FIGURE 1 is a diagrammatic arrangement of apparatus suitable for manufacturing fibers according to the present invention utilizing a static production system and a single charge technique; and FIGURE 2 is a vertical sectional view along lines 2—2 of FIGURE 1.

I have discovered that submicroscopic fibers containing crystalline silicon carbide having relatively uniform dimentions can be obtained through the vapor deposition of the reaction product resulting from the controlled oxidation of powdered silicon carbide by means of a reaction thereof with an atmosphere of carbon dioxide ($CO_2$), oxygen ($O_2$), and/or water vapor ($H_2O$). In its broadest aspects, then, my invention may be defined as comprising the heating of finely-divided SiC to a sufficiently high temperature in an atmosphere composed of $CO_2$, $O_2$, $H_2O$, or mixtures thereof, the partial pressure of these gases being carefully controlled, such that the SiC is oxidized to silicon monoxide (SiO) which in turn reacts with carbon monoxide (CO), which is also produced during the initial reaction, to cause the deposition of the desired SiC fibers.

In its simplest terms, the mechanism through which the SiC fibers are developed is believed to comprise two steps, viz:

(1) $\quad SiC + 2[O] \rightarrow SiO + CO$
(2) $\quad 3SiO + 1CO \rightarrow SiC + 2SiO_2$ where [O] represents any of the three oxidizing agents found operable in the invention. The first reaction occurs at a higher temperature than the second, the SiO and CO being gaseous products. There is believed to be a transport of these gaseous products from the reaction area, the gaseous SiO and CO combining together and condensing to a fibrous deposit of SiC at a temperature somewhat below that necessary to oxidize the powdered SiC and SiO. Various inert gases such as helium, argon, neon, and krypton have been optionally added to the reaction system.

A study of the reaction mechanism at various stages has led to the following conclusions as to the reactions which occur in the formation of the fibers.

(3) $\quad SiC + 2[O] \rightarrow SiO_{ads} + CO$
(4a) $\quad SiO_{ads} \rightarrow SiO_{gas}$
(4b) $\quad SiO_{ads} + [O] \rightarrow SiO_2$ The subscript, ads, denotes that the product is adsorbed on the surface of the SiC starting material. These reactions are followed by.

(5) $SiO_2 + SiC \rightarrow SiO_{ads} + Si_{ads} + CO$

Hence, the first reaction which occurs is the oxidation of SiC to SiO which is adsorbed on the SiC particles. This SiO may then react with the $CO_2$ atmosphere to form $SiO_2$ or may be liberated as a gas. Assuming that at least some of the adsorbed SiO reacts with the $CO_2$ present in the atmosphere, a sheath of $SiO_2$ will be formed around the SiC grains. $SiO_2$ will react with SiC but the reaction products must diffuse through the silica sheath. If this diffusion is rapid enough, the silica sheath will be consumed and this latter reaction will take place at an increasing rate. If the products cannot escape at a reasonable rate, the silica sheath remains and may become so thick that neither the reaction products nor the oxidizing agent can diffuse through within a reasonable time.

Experimentation has demonstrated that with $CO_2$ and $O_2$ as the oxidizing agents, the process proceeds principally through reactions (3), (4b), and (5) with a minor contribution from reaction (4a). Thus, with $CO_2$ as the oxidizing agent:

(6) $SiC + CO_2 \rightarrow SiO_{ads} + CO$
(7) $SiO_{ads} + CO_2 \rightarrow SiO_2 + CO$ and with oxygen as the oxidizing agent:

(8) $SiC + O_2 \rightarrow CO + SiO_{ads}$
(9) $SiO_{ads} + \frac{1}{2} O_2 \rightarrow SiO_2$ Although the reaction scheme is similar for $CO_2$ and oxygen, less CO is produced as a reaction product when oxygen is utilized as the oxidizing agent. This factor is advantageous since CO acts to repress the volatilization reaction.

However, in the case of oxidation with water, the primary reaction scheme is believed to consist of reactions (3) and (4a). Thus, the principal reactions are believed to be:

(10) $SiC + 2H_2O \rightarrow SiO_{ads} + 2H_2 + CO$
(11) $SiO_{ads} \rightarrow SiO_{gas}$ with only a very small contribution from the reaction:

(12) $SiO_{ads} + H_2O \rightarrow SiO_2 + H_2$

In the water oxidation, as with oxygen, only one mole of CO is produced for each mole of SiC reacted, so the reaction is not repressed to the same degree as with $CO_2$ oxidation. From a study of the SiC charge remaining after the reaction has occurred, it has been determined that the silica sheath adsorbed upon the SiC starting material ought not to be greater than about 0.5 microns and is preferably less than 0.1 micron. When the criticality of the depth of this layer is appreciated, one can then calculate from the particle size and the total amount of the SiC charge present the number of molecules of $SiO_2$ in a sheath of, say, 0.1 micron in thickness. Having calculated that figure, one can thereafter compute the number of oxidant molecules required to oxidizing a layer that deep. Then, having determined that number, one can finally calculate the partial pressure of oxidant needed to supply these molecules; this partial pressure necessarily depending upon the volume of the reaction chamber.

In summary, then, this invention is founded upon the oxidation of SiC to yield gaseous SiO and CO which will then react together to yield fibers containing SiC crystals. The reaction paths of SiC oxidation which lead to the desired overall reaction are dependent upon the identity and quantity of the oxidizing agent used.

In its broadest terms, this invention contemplates heating silicon carbide within a specific temperature range in an atmosphere containing controlled partial pressures of oxygen, water vapor, and/or carbon dioxide.

More specifically, this invention comprises heating a charge of SiC within the temperature range of about 1350° C.–1650° C., while a carefully controlled partial pressure of at least one of the above-identified oxidizing agents is introduced, for a period of time sufficient to produce the desired fiber formation, the partial pressure of the gaseous oxidizing agents being added generally ranging between about 5–300 mm. of mercury such that the silica sheath adsorbed upon the SiC starting material does not exceed about 0.5 micron in thickness. This procedure yields submicroscopic fibers composed of a core portion of beta-silicon carbide crystals with a surface sheath of silica. Examination of these fibers by electron microscopy and X-ray diffraction analysis has shown them to have diameters ranging about 100–500° A. (0.01–0.5 micron) and lengths up to 100 microns and, in some instances, even longer have been observed, thereby providing a maximum length to diameter ratio of about 10,000:1.

The growth of fibers begins substantially immediately when the necessary temperature and atmospheric conditions are obtained. This factor makes possible the continuous production of fibers since an amount of SiC charge could be introduced into the reaction zone to balance the amount of fibers removed as the reaction proceeds. However, in the practice of the invention, a reaction time of at least about one-quarter hour has been required to produce a good deposit of fibers. The rate of fiber growth is dependent upon the rate of oxidation of the SiC charge. This latter rate is directly related to the temperature utilized, as well as the oxidizing gas employed. Since there is this time-temperature relationship governing the rate of fiber production, much longer periods of time, say, 24 hours, may be required to obtain satisfactory fiber growths under some circumstances. In commercial practice, a reaction time of between about 1–5 hours is preferred although, in general, longer reaction times have no apparent deleterious effect upon the structure of the fibers. Nevertheless, since the increase in fiber yield is not substantial after such extended reaction periods, the practice is not considered economically sound.

It has been learned that nitrogen in the system greatly represses fiber growth. In view of this, then, although a minor amount of nitrogen can be tolerated, its substantially complete elimination is preferred. Although fibers can be produced in a dynamic reaction system wherein the oxidizing gaseous atmosphere is introduced during the heating up of the SiC charge so the air therein is flushed out before the reaction begins, it is more economical and efficient to draw a vacuum within the reaction chamber of less than 5 mm. of mercury and, preferably, less than 1 mm. of mercury before or during the heat-up to reaction temperature. If desired, an inert gas such as helium, argon, neon, or krypton may be introduced with the effective oxidizing gas.

Since the rate of the oxidation reaction is dependent upon temperature, it is a necessary result that the rate of transport of gaseous oxidation products, viz, SiO and CO, from the SiC charge proceeds more rapidly as the reaction temperature is increased. However, the partial pressure of the introduced oxidizing gas should not exceed about 300 mm. of mercury to avoid excessive oxidation of the reactant.

As was theorized above, it is believed that gaseous SiO and CO are produced during the oxidation of the SiC. These gases are then transported to a cooler area of the reaction chamber and there react together to produce the desired submicroscopic fibers. This reaction occurs in the temperature range of about 1100°–1350° C.

Since the oxidation of the SiC is temperature-dependent, it will be apparent that higher partial pressures of the oxidizing gases will be required at higher temperatures to insure an efficient reaction. Conversely, at lower temperatures lower partial pressures of gas must be employed to prevent repression of the reaction. Hence, at a temperature of about 1350 C., a partial pressure of an oxidizing gas as low as about 5 mm. of mercury will be sufficient to yield a satisfactory growth of fibers while at a temperature of about 1600° C. a partial pressure greater than 300 mm. may be required.

The most satisfactory deposits of fibers, both from the aspect of quality of fiber as well as quantity thereof, have been obtained where extremely pure starting materials have been used. Nevertheless, very acceptable fiber yields have been produced where less pure raw materials have been utilized, it being recalled that nitrogen should preferably be absent.

The fibers generally range in color from white to pale yellow; in some instances a bluish cast is observed. The surface sheath of silica, estimated to range from about 65–85% of the total mass of the fiber, has a great practical importance. This sheath permits the fibers to be readily wetted and dispersed in both polar and non-polar liquids. This property makes available a wide variety of organic and inorganic matrices for strengthening. Furthermore, this silica surface sheath seems to promote a stronger bond between the fibers and the material to be reinforced, thereby utilizing more fully the intrinsic strength of the fibers.

The appended drawings illustrate an apparatus useful for practicing the invention. The apparatus consists of a furnace or reaction chamber comprising a refractory tube closed at one end, would with wire such that a temperature gradient can be set up along the length of the tube, the closed end of the tube being the hotter end. A refractory container or "boat" containing the charge of SiC is positioned within the refractory tube in the area where the desired reaction temperature can be attained. The tube is then evacuated to a pressure of less than 5 mm. and, preferably, les than 1 mm. of mercury, the vacuum being maintained as the temperature is raised within the tube to permit substantially complete outgassing thereof. The temperature of the tube is raised to the range of 1350°–1650° C., in the area of the refractory boat, the oxidizing atmosphere being introduced at a predetermined partial pressure. The reaction boat is held at this temperature for a sufficient length of time to cause the development of a good yield of fibers, after which the furnace is cooled to room temperature.

Referring now to the specific details of the apparatus set out in the drawings, FIGURE 1 depicts a gradient furnace, shown generally in side elevation in cross section at 1, comprising an alumina, mullite, or sillimanite refractory tube 5 wound with platinum or platinum-rhodium alloy wire 4 surrounded with insulation 3, which in turn is enclosed and retained within a steel casing 2. The windings of the wire are spaced apart at predetermined distances to set up a temperature gradient along the length of the tube. A closed end inner or working liner 6 consisting of an alumina, mullite, or sillimanite refractory tube is utilized to protect wire-wound tube 5 from vapor corrosion and mechanical damage during furnace operation. Working liner 6 extends a short distance beyond the front of the furnace and is there connected to a pipe 10 through a glass connection 9. Pipe 10 in turn leads to a vacuum pump 12 through valve 11, or to a source of air (not shown) through valve 15, or through valve 13 to a source of oxidizing gas such as lecture bottle 14. A fairly close-fitting platinum disc 7 acts as a radiation shield to limit the escape of heat from the reaction chamber but yet allows the furnace to be evacuated and the oxidizing atmosphere to be introduced. An alumina refractory boat 8 holding a charge of finely divided SiC (preferably finer than 200 Tyler mesh material) is positioned within the working liner 6 in the area where the desired temperature can be attained. Finely-divided SiC is employed to present more surface area to reaction with the oxidizing gas. In general, the fiber yield is greatest where the SiC has a grain size of 10 microns or less.

In operation of the apparatus, as exemplified by the following examples, boat 8 was filled with a 0.5 gram charge of SiC having a particle size of about 10 microns and placed within working liner 6 at a position predetermined to attain the desired temperature. Radiation shield 7 was then inserted into place. Pipe 10 was then connected through glass connection 9 to working liner 6. The furnace was then heated to obtain a temperature of about 1200° C. in the area of the refractory boat 8 during which time a vacuum of about 1 mm. of mercury was drawn and maintained through vacuum pump 12. Thereafter, valve 11 was closed and valve 13 opened to allow the gas from lecture bottle 14 to flow into working liner 6 to a predetermined pressure during which time the furnace was rapidly heated to the desired temperature in the area of the reaction boat 8. Valve 13 was closed and this temperature was maintained for a predetermined length of time. The heat to the furnace was then cut off and the furnace allowed to cool. At about 400° C., valve 15 was opened to admit air to cool the furnace chamber and bring it to atmospheric pressure. Reaction boat 8 was then taken out of the furnace and the deposit of fibers removed and examined.

The examples recorded in Table I illustrate the effect of variations in added oxidizing gases upon fiber growth. Example 1 clearly demonstrates the need for an oxidizing atmosphere. The same apparatus and reaction charge were utilized in the other examples but a vacuum of about 5 microns of mercury was drawn and maintained throughout the run. Each description of fiber growth is an attempt to rank the yield by visual observation within the series indicated in terms of the arbitrary figures 1 to 10 where 1 denotes the lowest yield of fibers. Since in the apparatus described, the colder end of the reaction tube is at approximately room temperature, no more than about 20 mm. of water vapor can be added due to condensation.

TABLE I

| Example No. | Initial partial pressure (mm.) | | | Temperature of reaction, ° C. | Time, hours | Description |
| --- | --- | --- | --- | --- | --- | --- |
| | $CO_2$ | $O_2$ | $H_2O$ | | | |
| 1 | (¹) | (¹) | (¹) | 1,460 | 2 | (²) |
| 2 | 25 | | | 1,400 | 5 | 3 |
| 3 | 50 | | | 1,400 | 5 | 4 |
| 4 | 100 | | | 1,400 | 5 | 3 |
| 5 | 200 | | | 1,400 | 5 | 1 |
| 6 | 300 | | | 1,400 | 5 | 1 |
| 7 | 25 | | | 1,400 | 10 | 4 |
| 8 | 50 | | | 1,400 | 10 | 7 |
| 9 | 100 | | | 1,400 | 10 | 4 |
| 10 | 200 | | | 1,400 | 10 | 2 |
| 11 | 25 | | | 1,400 | 20 | 6 |
| 12 | 50 | | | 1,400 | 20 | 9 |
| 13 | 100 | | | 1,400 | 20 | 7 |
| 14 | 200 | | | 1,400 | 20 | 2 |
| 15 | 25 | | | 1,430 | 5 | 3 |
| 16 | 50 | | | 1,430 | 5 | 4 |
| 17 | 100 | | | 1,430 | 5 | 3 |
| 18 | 200 | | | 1,430 | 5 | 1 |
| 19 | 25 | | | 1,430 | 10 | 4 |
| 20 | 50 | | | 1,430 | 10 | 7 |

See footnotes at end of table.

TABLE I—Continued

| Example No. | Initial partial pressure (mm.) | | | Temperature of reaction, °C. | Time, hours | Description |
|---|---|---|---|---|---|---|
| | CO₂ | O₂ | H₂O | | | |
| 21 | 100 | | | 1,430 | 10 | 4 |
| 22 | 200 | | | 1,430 | 10 | 2 |
| 23 | 25 | | | 1,430 | 20 | 6 |
| 24 | 50 | | | 1,430 | 20 | 9 |
| 25 | 100 | | | 1,430 | 20 | 7 |
| 26 | 200 | | | 1,430 | 20 | 2 |
| 27 | 300 | | | 1,430 | 20 | 1 |
| 28 | 25 | | | 1,460 | 5 | 4 |
| 29 | 50 | | | 1,460 | 5 | 7 |
| 30 | 100 | | | 1,460 | 5 | 8 |
| 31 | 200 | | | 1,460 | 5 | 6 |
| 32 | 300 | | | 1,460 | 5 | 1 |
| 33 | 25 | | | 1,460 | 10 | 5 |
| 34 | 50 | | | 1,460 | 10 | 7 |
| 35 | 100 | | | 1,460 | 10 | 9 |
| 36 | 200 | | | 1,460 | 10 | 6 |
| 37 | 300 | | | 1,460 | 10 | 1 |
| 38 | 50 | | | 1,460 | 20 | 7 |
| 39 | 100 | | | 1,460 | 20 | 9 |
| 40 | 200 | | | 1,460 | 20 | 6 |
| 41 | 300 | | | 1,460 | 20 | 1 |
| 42 | 25 | | | 1,500 | 3 | 4 |
| 43 | 50 | | | 1,500 | 3 | 6 |
| 44 | 100 | | | 1,500 | 3 | 7 |
| 45 | 200 | | | 1,500 | 3 | 9 |
| 46 | 300 | | | 1,500 | 3 | 1 |
| 47 | 25 | | | 1,500 | 6 | 5 |
| 48 | 50 | | | 1,500 | 6 | 7 |
| 49 | 100 | | | 1,500 | 6 | 8 |
| 50 | 200 | | | 1,500 | 6 | 10 |
| 51 | 300 | | | 1,500 | 6 | 1 |
| 52 | 50 | | | 1,500 | 12 | 7 |
| 53 | 100 | | | 1,500 | 12 | 8 |
| 54 | 300 | | | 1,500 | 12 | 1 |
| 55 | 50 | | | 1,550 | 2 | 5 |
| 56 | 100 | | | 1,550 | 2 | 6 |
| 57 | 200 | | | 1,550 | 2 | 9 |
| 58 | 300 | | | 1,550 | 2 | 1 |
| 59 | 400 | | | 1,550 | 2 | 1 |
| 60 | 50 | | | 1,550 | 4 | 4 |
| 61 | 100 | | | 1,550 | 4 | 5 |
| 62 | 200 | | | 1,550 | 4 | 9 |
| 63 | 300 | | | 1,550 | 4 | 1 |
| 64 | 400 | | | 1,550 | 4 | 1 |
| 65 | 100 | | | 1,550 | 8 | 7 |
| 66 | 200 | | | 1,550 | 8 | 9 |
| 67 | 300 | | | 1,550 | 8 | 2 |
| 68 | 400 | | | 1,550 | 8 | 1 |
| 69 | 100 | | | 1,600 | 0.5 | 2 |
| 70 | 200 | | | 1,600 | 0.5 | 3 |
| 71 | 300 | | | 1,600 | 0.5 | 5 |
| 72 | 400 | | | 1,600 | 0.5 | 1 |
| 73 | 100 | | | 1,600 | 1 | 6 |
| 74 | 200 | | | 1,600 | 1 | 10 |
| 75 | 300 | | | 1,600 | 1 | 2 |
| 76 | 400 | | | 1,600 | 1 | 1 |
| 77 | 100 | | | 1,600 | 2 | 6 |
| 78 | 200 | | | 1,600 | 2 | 8 |
| 79 | 300 | | | 1,600 | 2 | 10 |
| 80 | 400 | | | 1,600 | 2 | 1 |
| 81 | | 50 | | 1,460 | 6 | 8 |
| 82 | | 100 | | 1,460 | 6 | 10 |
| 83 | | 200 | | 1,460 | 6 | 2 |
| 84 | | 300 | | 1,460 | 6 | 1 |
| 85 | | 50 | | 1,500 | 4 | 7 |
| 86 | | 100 | | 1,500 | 4 | 10 |
| 87 | | 200 | | 1,500 | 4 | 2 |
| 88 | | 300 | | 1,500 | 4 | 1 |
| 89 | | 100 | | 1,600 | 3 | 7 |
| 90 | | 200 | | 1,600 | 3 | 8 |
| 91 | | 300 | | 1,600 | 3 | 2 |
| 92 | | 400 | | 1,600 | 2 | 1 |
| 93 | | | 20 | 1,430 | ¼ | 2 |
| 94 | | | 20 | 1,430 | 5 | 4 |
| 95 | | | 20 | 1,430 | 8 | 5 |
| 96 | | | 20 | 1,430 | 30 | 10 |
| 97 | | | 20 | 1,500 | ¼ | 3 |
| 98 | | | 20 | 1,500 | 5 | 8 |
| 99 | | | 20 | 1,500 | 10 | 10 |
| 100 | | | 20 | 1,600 | 0.25 | 6 |
| 101 | | | 20 | 1,600 | 0.5 | 8 |
| 102 | | | 20 | 1,600 | 2 | 9 |
| 103 | | | 20 | 1,600 | 4 | 10 |
| 104 | | 100 | 20 | 1,500 | 2 | 10 |
| 105 | (³) | (³) | (³) | 1,500 | 2 | 1 |
| 106 | (⁴) | (⁴) | (⁴) | 1,500 | 2 | 1 |

¹ Vacuum, 5 microns.
² None.
³ 200 mm. helium.
⁴ 200 mm. argon.

The refractory tubes forming the reaction chambers in the above-described apparatus tend to deform and occasionally completely collapse when a high vacuum is drawn therein at temperatures higher than about 1450° C. to overcome such hazards, an inert gas such as argon or helium was introduced in combination with the oxidizing gas to produce a total partial pressure within the tube of at least 200 mm. of mercury. These additions may have a slightly beneficial effect upon the quantity of fibers deposited since they may aid in the transport of the gaseous reaction products, but, as Examples 105 and 106 demonstrate, these atmospheres in themselves produce essentially no fibers. The addition of these diluent gases provides one practical advantage in that the reaction system may be operated at atmospheric pressure. However, the addition of high partial pressures of these inert gases appears to exert a repressing effect upon fiber growth so this practice should preferably be used only at the higher reaction temperatures.

This table clearly illustrates the effect of variations in reaction temperatures, times, and in the partial pressures of the oxidizing gases employed upon the growth of fibers. That there is a fairly direct relationship between the reaction temperature employed and the partial pressure of oxidizing gas which will produce the greatest growth of fibers is quite evident. Thus, the formation of gaseous reaction products is quite slow at the colder end of the effective temperature range and a high partial pressure of the oxidizing gas appears to exert a repressing effect upon the growth of fibers. At higher temperatures the rate of reaction is much faster and higher partial pressures of oxidizing gas are useful to optimize the deposition of fibers. This greater speed of reaction is desirable for commercial practice and temperatures ranging between 1500°–1600° C. have been deemed most suitable for commercial production. Finally, although higher partial pressures of oxidizing gas are beneficial at high temperatures, pressures in excess of about 300 mm. of mercury cause too thick a layer of silica to be formed upon the SiC starting material and should preferably, be avoided. As has been explained above, the thickness of the adsorbed $SiO_2$ sheath upon the fine-grained SiC particles is the primary limiting production factor rather than the partial pressure of the oxidant gas used. Thus, where the depth of this $SiO_2$ layer is greater than about 0.5 micron, the reaction leading to the formation of fibers cannot proceed at any reasonable rate. The number of oxidant molecules needed to produce an adsorbed layer of $SiO_2$ of a certain depth can be calculated from the particle size and the amount of SiC charge present. The partial pressure of oxidant necessary to produce such a layer is related to the volume of the reaction chamber, it being apparent that the same number of oxidant molecules will be under a lower partial pressure in a large reaction chamber than in a small one. In the examples recorded in Table I, the working liner 6 had an inner diameter of 1.5" and was 4' long. With such a reaction chamber, the maximum partial pressure of oxidant which could be utilized to yield a satisfactory deposit of fibers was about 300 mm. of mercury. This maximum pressure will vary somewhat where larger or smaller reaction chambers were used. Thus, the present invention contemplates partial pressures of the oxidizing gases ranging from at least 5 mm. of mercury but not higher than such pressure as would cause the adsorption of a sheath of $SiO_2$ on the finely-divided SiC greater than about 0.5 micron in depth.

That the rate of fiber growth is temperature responsive is also evident. Hence, at temperatures around 1600° C., substantial fiber deposition can be produced in about 30 minutes. Nevertheless, where reaction temperatures much above 1650° C. are utilized, attainment of a growth of fibers which are reasonably uniform in diameter becomes very difficult and the fibers tend to become compacted together, thereby impeding their separation and dispersion. At the other end of the effective range of reaction temperatures, vis, about 1350° C., the rate of fiber deposition is so slow and the yield thereof so little within a reasonable reaction time that temperatures much below that figure are not deemed practically feasible.

It will be understood that although the process of the invention has been described in terms of a static system, the required interrelation of temperatures, times, and ambient atmospheres can be obtained in a dynamic reaction system through variations in apparatus design. Likewise, it will be appreciated that modifications in design in the illustrated reaction apparatus and in the specifically detailed operational steps may be made without departing from the scope of the invention provided the necessary combination of temperatures, times and ambient atmospheres is followed. In any event, the determination of these process parameters and the apparatus design requirements is readily definable by one skilled in the art within the guidelines of the basic description set forth above.

I claim:
1. A method for manufacturing submicroscopic fibers containing silicon carbide crystals comprising the steps of providing a charge of finely-divided silicon carbide in a reaction chamber, contacting said charge at a temperature between about 1350°–1650° C. with an atmosphere containing at least one oxidizing gas selected from the group consisting of carbon dioxide, oxygen, and water vapor, said oxidizing gas having a total partial pressure of at least 5 mm. of mercury but not higher than would cause the adsorption of a layer of $SiO_2$ on the finely-divided silicon carbide charge greater than about 0.5 micron in depth, maintaining said temperature for a period of time sufficient to attain the desired fiber formation, and thereafter cooling the fibers to room temperature.

2. A method for producing submicroscopic fibers according to claim 1 wherein the total partial pressure of the oxidizing gas ranges between about 5–300 mm. of mercury.

3. A method for producing submicroscopic fibers according to claim 1 wherein the period of time sufficient to attain the desired fiber formation ranges from about 15 minutes to 24 hours.

4. A method for producing submicroscopic fibers according to claim 1 wherein the charge of finely-divided silicon carbide is contacted at a temperature between 1500°–1600° C. and this temperature is maintained about 1–5 hours.

5. A method for producing submicroscopic fibers according to claim 1 wherein the atmosphere consists of at least one inert gas selected from the group consisting of helium, neon, argon, and krypton admixed to the oxidizing gas.

6. A method for producing submicroscopic fibers according to claim 1 wherein the reaction chamber containing the charge is evacuated to an absolute pressure of not more than about 5 mm. of mercury before the charge is contacted at 1350°–1650° C. with the oxidizing gas.

References Cited
UNITED STATES PATENTS

| | | | |
|---|---|---|---|
| 3,161,473 | 12/1964 | Pultz | 23—208 |
| 3,166,380 | 1/1965 | Kuhn | 23—208 |
| 3,175,884 | 3/1965 | Kuhn | 23—208 |
| 3,246,950 | 4/1966 | Gruber | 23—208 |
| 3,271,109 | 9/1966 | Mezey et al. | 23—208 |
| 3,335,049 | 8/1967 | Pultz | 117—106 X |

ALFRED L. LEAVITT, *Primary Examiner.*

A. GOLIAN, *Assistant Examiner.*